United States Patent [19]
Acher

[11] 3,830,694
[45] Aug. 20, 1974

[54] CONTROL ROD DRIVE FOR NUCLEAR REACTORS

[75] Inventor: Heinz Acher, Friedberg, Germany

[73] Assignee: Licentio Patent-Verwaltungs-G.m.b.H., Frankfurt, Germany

[22] Filed: May 8, 1972

[21] Appl. No.: 251,228

[30] Foreign Application Priority Data
May 8, 1971 Germany............................ 2122846

[52] U.S. Cl.......................... 176/36 R, 91/44, 92/23
[51] Int. Cl............................ F15b 15/26, G21c 7/08
[58] Field of Search .......... 176/36 R; 91/41, 44, 45; 92/19, 22, 23, 24, 30

[56] References Cited
UNITED STATES PATENTS
2,582,030  1/1952  Halward............................... 91/445
3,398,492  8/1968  Nansel................................... 92/23
3,524,924  8/1970  Germer............................. 176/36 R
3,527,670  9/1970  Winders........................... 176/36 R Primary Examiner—Martin P. Schwadron
Assistant Examiner—A. M. Zupcic
Attorney, Agent, or Firm—Spencer & Kaye

[57] ABSTRACT

A nuclear reactor control rod drive having relatively wide annular gaps for hydraulic fluid between relatively movable parts in the device. Guide structure associated with movable control pistons in the device provides for mounting of these pistons approximately concentrically within a guide tube and with less play with respect to this structure than the clearance between bearing surfaces at the guide tube. Hydraulic fluid at a pressure in excess of fluid pressure in the reactor can be selectively fed into the guide tube from the top of the tube for a rinsing operation.

14 Claims, 9 Drawing Figures

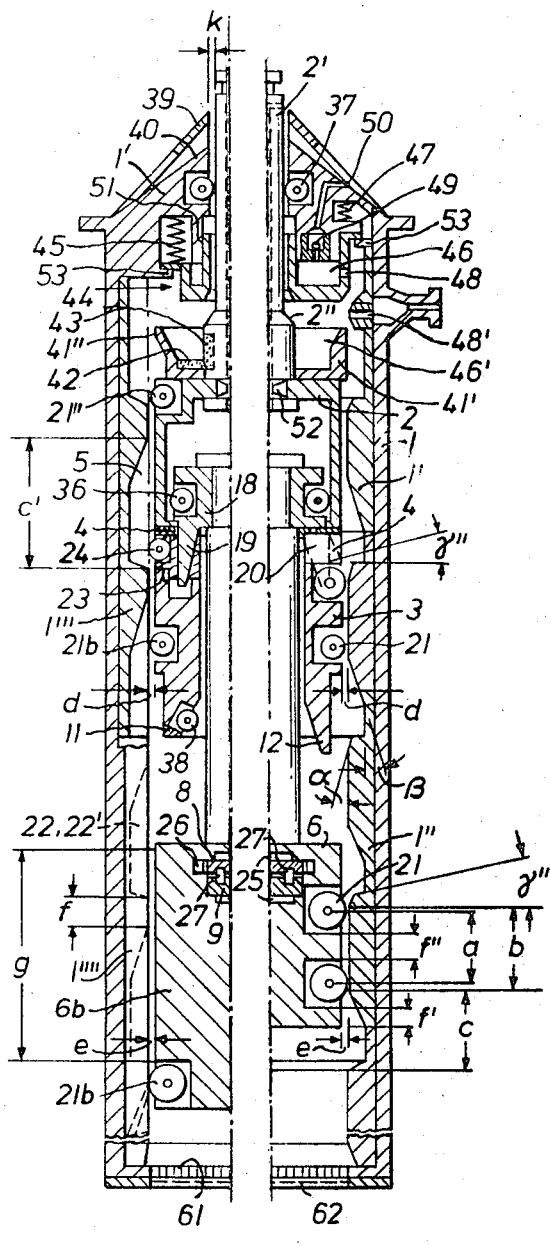
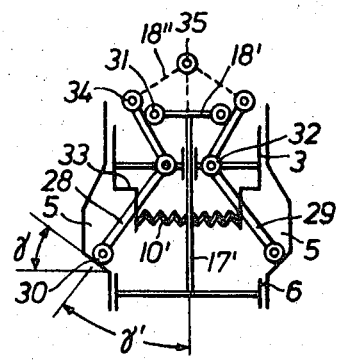
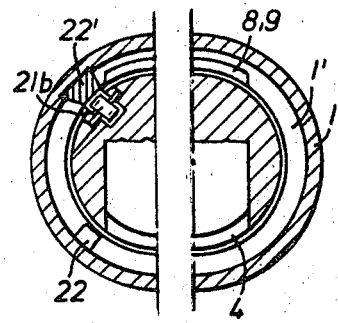

CONTROL ROD DRIVE FOR NUCLEAR REACTORS

BACKGROUND OF THE INVENTION

The present invention relates to nuclear reactors and particularly to drive systems for the control rods thereof.

The control rod drive according to the present invention is an improvement of the control rod drive disclosed in U.S. application Ser. No. 150,360, filed by Peter Daublebsky and Günter Zeitschel on June 7th, 1971, entitled "Nuclear Reactor Control Rod Drives," now U.S. Pat. No. 3,779,134, issued Dec. 18, 1973, and assigned to the assignee of the present application, and is particularly adaptable for use within a pressure vessel of a nuclear reactor. In general, the control rod drive, as disclosed in the previously filed application, has control pistons which are moved in a guide tube by a pressure medium. The movement of the control pistons is controlled by latches on the pistons which are operatively associated with detents in the guide tube.

More particularly, in that application there is shown a drive system in which an upper control piston is associated with a lower control piston in the guide tube. There are latches on both pistons which can be engaged in the detents in this tube. Devices are provided for alternating release of the latches, of the respective pistons, from the detents. This arrangement permits alternating movement of the two control pistons from one detent to the next in each step, in the same axial direction, and the control piston at rest is locked in each detent by its latch device.

Thus, for the downward step of the two control pistons within the guide tube there must be a pressure difference corresponding to the sliding friction between the upper piston and the lower piston on the one hand, and between the lower piston and the cylinder chamber containing the lower piston on the other hand. This pressure difference is relatively large when the latches on the upper piston are retracted from the detents since the friction resulting from the entire weight of the upper control piston with an integral lifting piston and control rod must be overcome by the conical surfaces on the latch release devices. Moreover, an increase in the pressure difference is practically ineffective for overcoming this friction since an automatic amplification effect is in principle present, i.e. an increase in the pressure difference results in an increase in the friction.

On the other hand, the friction must be strong enough so that the latches will not be pulled out of the detents at a different pressure difference or at pressure equilibrium due to the inherent weight of the lower control piston with its associated parts.

In view of the above it can be appreciated that the accurate dimensions of the angles of the conical surfaces at the latch release devices, as well as of the clearances provided for the movement of the control pistons, are important. Obviously, too, it is important that a good and constant sliding friction be maintained. However, this latter condition cannot always be maintained due to friction corrosion, oxidation and foreign elements in the reactor water which can lead to interruptions in the operation of the reactor.

With an arrangement of the control rod drive in the interior of the pressure vessel it is particularly important to design all components, and their functions, with respect to one another, with a view toward operational dependability as well as best possible applicability and long life. Maintaining a supply of spare parts will be more expensive since the drive components can extend to the lower edge of the core and the connecting rod, when a slotted control rod is used, and can extend even into the core so that they become highly radioactive. In contradistinction to drives disposed outside of the pressure vessel there is almost no way of effecting repairs, or this is very difficult, and generally the complete drive will have to be replaced by a new one. Therefore, relatively inexpensive materials must be used.

Also when there is the slightest malfunction in the control rod drives, the pressure vessel cover must be removed and the corresponding nuclear cell must be discharged, which leads to dead times and this problem is not encountered when external drives for the control rods are used.

Because of these problems the control rod drive which is disposed in the interior of the pressure vessel must be substantially less subject to malfunction, particularly in the case of light water reactors, for example with reactor water which is completely desalinated and at a temperature of 286°C. Experience has shown that, in spite of filtering of part of the stream, the primary water circulating in the reactor cannot be kept free from impurities, for example in the form of oxidation products.

Moreover, as was found in existing systems, the drive components in the pressure vessel very quickly are covered with a dull, almost black oxidic layer which can have very unfavorable effects, as do the impurities. Finally, the nuclear radiation has an adverse influence on the structure of the material used in the drives and the danger of stress corrosion and radiation substantially limits the selection of materials which have the necessary corrosion and wear resistance. For these reasons and in view of the expenditures involved, particularly because of the need to exchange drives, it is desirable to use, for example, a chromium or nickel material.

SUMMARY OF THE INVENTION

It is therefore an object of the present invention to provide a control rod drive which avoids those problems, set out above.

Thus, in an embodiment of the present invention these problems are solved by providing for more than the usual bearing clearance, or annular hydraulic gap, between all parts which move with respect to one another. Furthermore, the clearances at the upper and lower control pistons are adapted, relative to one another, to correspond to the friction and pressure conditions. In addition, both control pistons are mounted at least approximately concentrically with less play within the clearance space, with respect to the bearing surfaces on rolling or sliding elements. Further, an excess pressure with respect to the reactor pressure, which will not actuate the latch mechanism, is maintained at least temporarily in that rinsing water, preferably taken from the primary water supply, is fed in at the upper end of the guide tube through a choke or braking sleeve.

Thus the drive according to the present invention prevents eccentricity, in a hydraulic respect which would interfere with the operation of the drive and also provides maximum clearances so that impurities can be rejected or washed out.

With resepct to movement of the control drive in steps without malfunctions, it is further proposed to provide, at least at the upper control piston bearing the control rod weight, a mechanism instead of the latches, which will substantially reduce the automatic amplification effect, and this is preferably done by means of rollers.

It is still further proposed to improve the friction conditions at the adjustment mechanism, preferably through the use of roller bearings for the latches and by slanted approach surfaces for the detents, which have a strong material hardness and surface quality so that constant resistance to wear is assured. This type of construction makes relatively large clearances in the drive possible.

It is also important that entry of impurities into the drives be prevented as much as possible by means of stripper surfaces with collecting pockets and sieves where possible. For this purpose it is also proposed to make the gaps and mesh widths of these means smaller than the smallest clearances required for the device to function or for the bearing play in the drive.

Finally, a further improvement involves a passive and active rapid shut-down system and the use of a hydraulic-mechanic brake which requires no additional external auxiliary systems and provides for automatic and dependable resetting.

BRIEF DESCRIPTION OF THE DRAWING

FIG. 1a is a sectional view of one embodiment of control rod drive according to the present invention.

FIG. 1b is a sectional view of another embodiment of the invention.

FIG. 2a is a plan sectional view of the control rod drive of FIG. 1a.

FIG. 2b is also a plan sectional view of the control rod drive shown in FIG. 1b.

FIG. 3 is a diagrammatic view of another embodiment of a latching device for the control pistons, which is different from that of the embodiments shown in FIGS. 1.

DESCRIPTION OF THE PREFERRED EMBODIMENTS

Figure 4:
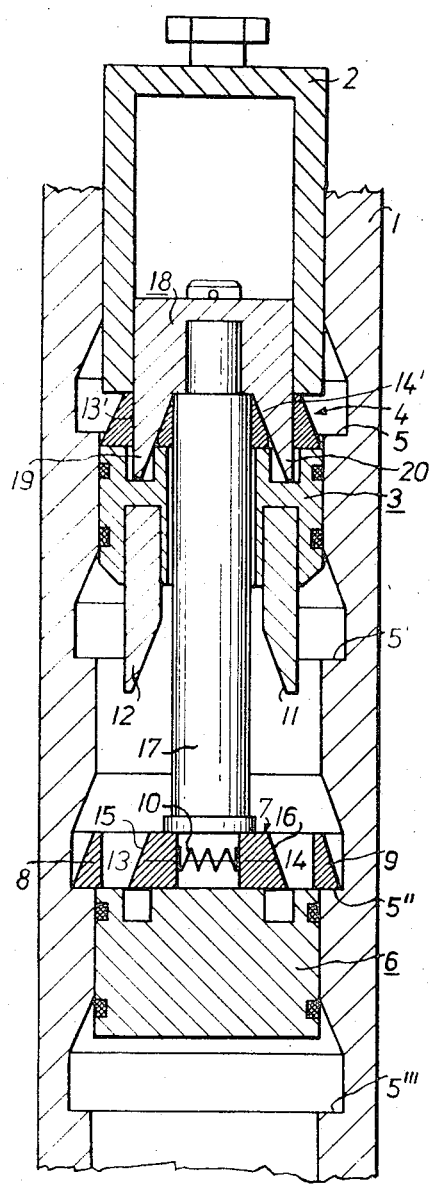
FIG. 4 is an elevational cross-sectional view of a control rod drive according to the disclosure of the previously filed application.

Before discussing the embodiments of the present invention it will be helpful to consider the structural arrangement of one embodiment of the control rod drive as disclosed in previously filed application Ser. No. 150,360. Attention is directed to FIG. 4 which shows a hydraulic control rod drive disposed in a nuclear reactor in the pressure vessel below the core lattice, or matrix, plate (not shown). A guide tube 1 is provided in which a lifting piston 2 can slide together with its control rod absorber portion (not shown). The lifting piston 2 rests on an upper control piston 3 which is provided with a locking device, generally indicated at 4. The locking device 4 may engage in detents 5, 5', 5'', etc. in tube 1 and thus prevent a downward movement of the upper control piston 3.

Below the control piston 3 a second control piston 6 is disposed in guide tube 1 and has a locking device, generally indicated at 7. This locking device 7 is constructed in the same manner as locking device 4 and consists of two latches 8 and 9 which are pressed apart, for example by means of springs 10. Latches 8 and 9 are here so shaped that they slide out of the detents in which they are engaged when the lower control piston 6 moves upward, but engage the detent during a downward movement. The two latches may be offset axially from one another at the center of the tube so that they come to rest on top of one another and guide each other.

The upper control piston 3 has two axially dependent fingers 11 and 12 which are designed to fit into slits 13 and 14 of latches 8 and 9. The slits 13 and 14 have oblique portions 15 and 16 so that latches 8 and 9 are moved radially inwardly out of their associated detent 5, 5', or 5'' when fingers 11 and 12 move into slits 13 and 14.

The lower control piston 6 has a coaxial extension 17 which passes through the upper control piston 3 and which has an attachment 18 at its upper end with axially dependent fingers 19 and 20 which correspond to fingers 11 and 12 and can engage in the same manner into slits 13' and 14' in the latches of the upper locking device 4. As seen in FIG. 4 the fingers 19 and 20 are engaged in the locking device 4 to retract the device from detent 5. Extension 17 has a radial opening at its lower end for passage of latches 8 and 9.

The necessary connecting line for the pressure medium to operate the control rod drive is not shown, nor are the connections in the control rod drive which assure that the full reactor pressure is effective on the upper surface of the upper control piston 3 while a somewhat lesser pressure is present on the upper surface of the lower control piston 6.

The device shown in FIG. 4 operates as follows. The pressure in the reactor vessel first moves the unlocked upper control piston 3 together with its locking device 4 downward toward the locked lower control piston 6. The locking device 4 of the upper control piston 3 then comes to engage in detent 5' and locks the control piston 3. During this downward movement, the lifting piston 2 which rests on the upper control piston 3 has descended, together with its absorber part, by the same distance. Fingers 11 and 12 have moved into slits 13 and 14 of locking device 7 on the lower control piston 6 during the downward movement of the control piston 3 and have retracted latches 8 and 9 to unlock control piston 6.

If now the operating pressure below the lower control pitson 6 is reduced, this piston moves downward to the next lower detent 5'''. As soon as it has engaged therein, fingers 19 and 20 of attachment 18 engage slits 13' and 14' to retract locking device 4 from detent 5' so that now the upper control piston 3, as already described, is again urged downwardly until it reaches a position where locking device 4 engages in detent 5''.

Simple control of the pressure difference between the lower surfaces of control pistons 3 and 6 causes the upward movement of the control rods but in the inverse sequence to that of the downward movement.

With the above description of a known control rod device in mind attention is now directed to FIGS. 1a and 1b, where the same parts appearing in the previously filed application will be identified by the same reference numerals. In further explanation of these figures it should be observed that two embodiments of the invention are shown side by side. Thus, in interpreting these figures, FIG. 1a shows one embodiment and another embodiment is shown in FIG. 1b.

With respect to the embodiment shown in FIG. 1a, it can be seen that, in order to prevent sliding friction between the control pistons 3 and 6 and the guide tube 1, the control pistons 3 and 6 are guided by rollers 21. Piston 6b with rollers 21b represents an alternative embodiment shown in FIG. 1b.

Returning to FIG. 1a, rollers 21 for each of control pistons 3 and 6 can be provided either singly or in pairs and when in pairs, as shown for piston 6, are arranged at a spacing $a$ and move on the inner cylindrical jacket of detent sleeves 1' or 1'', respectively, which are inserted into the guide tube 1. These sleeves are composed of segments each having a length $b$. Between the sleeve segments are detents each having a gap height $c$ and including the actual clearance or gap with the roll-off angle $\alpha$ and the approach angle $\beta$. Reference numerals 1'-1'''' are intended to identify sleeves which may have respectively different lengths.

In order to have uniform and axial guidance of the pistons during the entire stroke, the following relationship must be maintained: $a$ less than $b$ and $c$ less than $a$.

Advisably three or more rollers are uniformly distributed in one horizontal plane around the periphery of the pistons. A sliding guidance can be effected by slide elements of the length $b$ (not shown) which are attached to the control pistons.

Rollers 21b, as seen in FIGS. 1b and 2b, move without interruption in their guidance path on rails 22 and 22' which extend over the entire stroke of the pistons. Rails 22 and 22' differ from one another only with respect to their cross sections. The rails are inserted into detent sleeves 1''' and 1'''' and end at least at the inner cylinder of the detent sleeves. Rails can also be provided with wear-resistant material and can cooperate with similar material at the corresponding contact surfaces of the control pistons to produce sliding friction.

If four rollers are used in each plane, they must be angularly offset from one another by an angle of 90°, as is shown in FIG. 2b. This arrangement is necessary if latches 4 and 8, 9 are angularly offset from one another, i.e. if the movement of latches 8, 9 is in a direction at right angles to the direction of movement of latches 4, to enable all latches to move between adjacent rollers to engage the annular rings of detent sleeves 1''' and 1''''.

In FIGS. 1a and 1b latches 8, 9 are shown angularly offset by 90° relative to latches 4. However, fingers 11 and 12 are shown at locations offset by 90° from the locations which they must have to operate latches 8, 9. This intentional displacement is used to permit illustration of the shape of the fingers, which would otherwise be hidden by the coaxial extension (17 in FIG. 4) of piston 6.

The control pistons, when guided by rails 22, 22' in the embodiment of FIG. 1b, rather than by the inner wall of the jacket as in the embodiment of FIG. 1a, permit the establishment of a detent gap height $c'$ extending over almost the entire distance separating adjacent detent positions. The height $c'$ represents the actual detent gap length and roll off and approach surfaces.

In comparison, in the embodiment of FIG. 1a, detent gap height $c$ has a length of only nearly one-half the distance separating adjacent detent positions. The disadvantage of the embodiment of FIG. 1a is that when the distance separating adjacent detend positions is above a particular value, a latching movement produces a high rate of wear on the oblique approach surface due to the impact of the latches thereon. In contrast, in the embodiment of FIG. 1b, when piston 3 is to be latched, its latches 4 would jump into the detent gap 5 against the abutment 23 of piston 3 due to the action of the pressure spring 10 (FIGS. 3 and 4). This would occur without the roller or rollers 24, disposed in the latches, having contacted the approach surfaces, inclined at the angle $\beta$, and without the roller itself being able to abut on the bottom of the gap. Upon further raising of the control piston 3, roller or rollers 24 would then contact the oblique surface inclined at angle $\beta$, and this occurs without producing practically any wear. Only at the oblique roll-off surfaces inclined at angle $\alpha$ (FIG. 1a) would there be a slight frictional engagement in both cases since with the correct dimensioning, the angle $\alpha$ can be brought at least to that dictated by the required rapid shut-down speed and, with reference to the spreading speed of the latches, almost or completely to a value of zero, i.e. for these surfaces to be almost or completely vertical. There still is an advantage even if roller 24 is not provided, which is the case in FIG. 1a. Then sliding friction would exist also at the oblique approach surface but the impact friction would be eliminated.

In order to eliminate the sliding friction of the latches within the control pistons, centerless rollers 25, 26 and 27 should also be provided, at least in part. This is seen in FIGS. 1a and 1b with respect to their use in the lower control piston.

At least for the control piston 3, an alternative embodiment as shown in FIG. 3 could be provided for the latches to produce the same latching function but with a pivoted mechanism. Instead of driving latches 4 or 8 and 9, a compression spring 10' drives roller levers 28 and 29, if required each lever being provided with a roller 30, for the insertion of the control rod and for the latching of the control piston. For unlatching, the levers 28 and 29 are driven via the rod assembly 17' with the lever attachment 18', if required also provided with rollers 31. Alternatively, a double lever system without rollers but including a lever attachment 18'' and the pivot points 34 and 35 can also be provided. It is here important that the contact angle $= \gamma = \gamma'$.

The angle $\gamma''$ however may also be 0° as depicted in FIG. 1a. However an angle more than 0° is recommended. The angle $\gamma''$ is equal to the angles $\gamma$ and $\gamma'$, each of which is equal to the inclination of the bearing surface for the latches in the inner jacket forming the detents. This angle $\gamma''$ is 0° at the three upper detents of FIG. 1a and different from 0° at the next lower detent, which is adjacent piston 6. The control piston 3 has the pivot axes for levers 28 and 29 at points 32, and these levers themselves can be held, via the abutments 33 of piston 3, to support the impact, for example, of roller 30 at the bottom of the detent gap 5.

Returning to FIGS. 1a and 1b, to avoid sliding friction of attachment part 18 within the lifting piston 2, and at the lifting piston rod 2', as well of lifting piston 2 with respect to rail 22 and detent sleeves 1' or 1", additional rollers 36, 37, 21' and 21, respectively, can be attached to settable and adjustable axes and at least rollers 21' and 21 can be arranged in pairs having a desired spacing $a$, as shown for rollers 21 on piston 6 in FIG. 1a.

For producing the desired hydraulic effect for the adjustment to be produced, it may be of advantage if the annular gap $d$ at the upper control piston is dimensioned to be somewhat larger or smaller than annular gap $e$ at the lower control piston. Annular gap $e$, however, may also be of the same size as $d$, for example if the mechanism of FIG. 3 is to be used or when it would be advantageous for rinsing without control piston actuation. It is important that when moving beyond the gap region $f$ (FIG. 1b) the piston length $g$ be in such a relationship to the detent gap height $c'$ that the effective gap region $f$ can never become smaller throughout the entire stroke — and possibly also not larger. In this case at least one hydraulic effective gap region in all positions of the piston 6' relative to the detents is available. It should be in this connection noted, that the sum of $f$ and $c'$ is equal to the entire detent distant.

The same applies in the arrangement of FIG. 1a for heights $f'$ and $f''$ with respect to $b$. In this case, it is also achieved that analogously to the guidance relationship described above on page 12, line 17 — in all positions of the piston 6 one effective gap region $f'$ or $f''$ is available.

Both arrangements described for the control piston 6 are also applicable for the control piston 3, if required with lifting piston 2.

It should be added that rollers 38, one of which is shown in FIG. 1b, can also be attached to fingers 11 and 19 of FIG. 1b and 12 and 20 of FIG. 1a, or correspondingly at latches 4, or 8 and 9 (not shown), which eliminates at least at the finger or at the latch a need for a conical surface, and thus eliminates sliding friction.

Opposite the piston rod 2' and the upper part 1' of the guide tube 1 there is also provided as shown in FIGS. 1a and 1b a gap $k$, with round stripper sheets 39 and 40 being attached according to one feature of the present invention. These prevent entry from the pressure vessel of foreign material at least of a size less than the smallest gap or clearance in the drive system. This must not absolutely apply to the roller bearings if the lateral bearing or its support have some play which is less than the dimensions of the passing foreign bodies. It must be noted that such foreign bodies can be washed away in the rinsing stream in a scram situation or, in a special case, at the lowermost rod position in a very strong stream in the opposite direction which lies above the rinsing stream because the drive is constructed to have gaps all around its periphery. The stream for the adjustment here has a similar effect. A coarse sieve 61 with fine sieve 62 seen at the bottom of FIGS. 1a and 1b are not absolutely necessary when the above-described measures are carried out, but they may be desirable.

A collecting or accumulation sleeve 41" may be provided as shown in FIG. 1b, on the lifting piston 2, and preferably contains circular permanent magnets, for example natural magnets 42 and 43, so that oxidic or drift products, for example from the ferrite lines in the primary circulation system, can be collected and trapped. The magnets are made corrosion resistant on their outside by a suitable known plating layer. A specific material which can serve as the plating layer may be chrome for instance.

The piston rod 2' has a conical collar 2" which abuts against a choke or brake sleeve indicated generally at 44, at the end of the upward stroke. The kinetic energy of the parts moved during rapid shut-down are thus both mechanically and hydraulically braked. The braking takes place either only by means of a plate spring column 45 shown in FIG. 1b or by displacement of water in chamber 46 with a final braking by the plate spring 47, as shown in FIG. 1a. It should be noted that the water disposed between the plate springs produces an additional hydraulic braking when the spring plates are pressed together. In the braking arrangement of FIG. 1a there occurs a successive covering of different sized choke openings 48 with respect to a fixed edge belonging to the upper part 1a, resulting in a progressive pressure increase in chamber 46. This chamber may also be, for example, the upper drive chamber 46' formed by sleeve 41' attached to piston 2.

Choke openings 48' are disposed at the input sleeve for the water for driving the control pistons 3 and 6 or they may be arranged to be open with respect to the pressure vessel. The covering of this choke opening is effected by the lifting piston 2 or by the collecting sleeve 41' provided for this purpose. Above chamber 46 there is a check valve 49 which permits displacement of the water through the choke openings 48 during braking. In this case the water for driving the control pistons can reach the drive through line 50 and openings 48. The choke resistance can here press or hold the brake sleeve 44 in braking readiness position. However the same thing can be effected by a spring in chamber 46, which is not shown. The return movement of sleeve 44 to collar 53 should here be braked in an advantageous manner not shown. The brake sleeve 44 possibly has a narrow slide fit which will not be touched by any foreign elements from the pressure vessel. This slide fit corresponds to a strong choke location which requires, when a plate spring column 45 is used, a check valve (Position 74 in FIG. 5) possibly below or above the fine sieve 62, so that the lifting piston cannot be driven in the rod removal direction. This check valve is provided with a compression spring disposed against the recoil direction, which spring permits the water to flow into the reactor for purposes of rinsing or washing away.

To effect a passive rapid shut-down (described in U.S. application Ser. No. 170,878, filed by Peter Daublebsky, Gunter Zeitzschel and Jean Mattern on August 11$^{th}$, 1971 entitled "Control Rod Drive In The Interior Of A Pressure Vessel"), the water must flow from the pressure vessel through this check valve and in the case where an active rapid shut-down (later described) is to be provided it must flow from an external energy source through a second check valve (element 69 in FIG. 5) into the operation chamber.

On the basis of FIGS. 5 and 6 it will now be explained how the drive according to the invention is suitably actuated. In this connection it is necessary to differentiate between operation with rapid shut down (Scram) and operation in the notch positions in normal operation. The first case applies in the event of a danger situation when the rod is shot-in very quickly, while in the second event operation is adjusted to normal running, burn-up is regulated etc.

Figure 5:
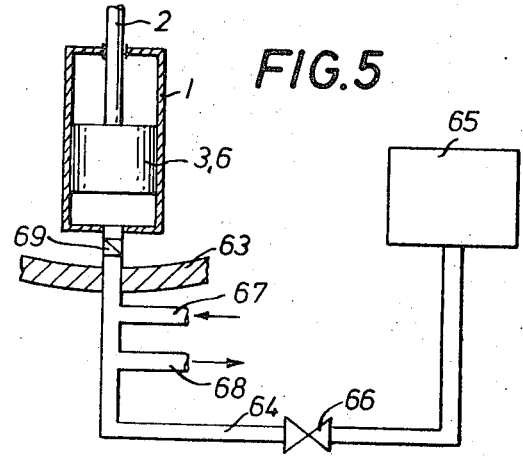
FIGS. 5 – 7 are simplified cross-sectional views of three systems according to the invention for effecting movement of the control rod drive.
Figure 6:
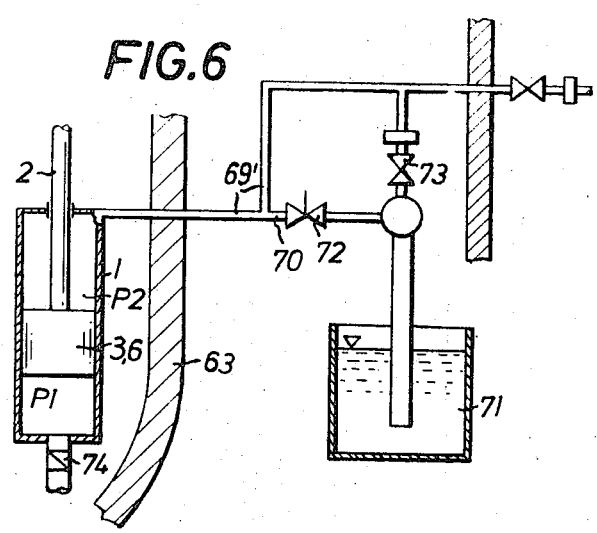

When considering the process the starting point should be that, as will be recognized from FIGS. 5 and 6, the drive according to the invention is in principle a piston 3, 6 which is moved hydraulically or pneumatically in the guide tube 1 acting as a cylinder. The piston-cylinder arrangement in this case is located in the inside of the reactor pressure vessel 63 under a core not represented. A rod 2 is fixed to the piston, and it bears the absorber portion (not represented) which is operated in the reactor core.

If the piston is to be moved upwards, the pressure $p1$ must be greater than pressure $p2$. In the case of a downwards movement conditions are precisely the reverse.

These pressure differences can now in principle be obtained in various ways, i.e. by supplying an increased pressure under the piston (FIG. 5) or releasing pressure from the space over the piston (FIG. 6). As regards the fast shut down the former is described as active rapid shut down and the latter as passive rapid shut down. Both methods may also be used in combination.

With only an active rapid cut-out (shut down) of the reactor, according to FIG. 5, pressurized water is supplied via a pipe duct system 64 after the opening of the valve 66 from a pressurised container 65, under the control piston 6 or 3 which shoots this and with it the lifting piston or the control rod in the upper end position against the throttle or brake box 44 (FIGS. 1a, 1b). The water located above this control piston as well as the gap loss amount can with this, for example, be supplied by the lifting rod 2 outside the guide pipe 1 into the inside of the pressure vessel.

Furthermore, with a drive according to FIGS. 1a and 1b this water may also be led to the outside via perforations in the brake box 44 (not shown); these perforations become open at a position which appears after movement of spring 45 corresponding to a force of pressure x surface area during the injection. On the impact of the rod collar 2" flow through the perforations is blocked as a result of the deeper penetration of brake box 44, and braking is complete.

In similar manner to the active fast shut-down the control rods may also be driven actively upwards in the notch positions. In this connection the contruction may be such that a pipe duct 67 provided with a check valve opens out additionally either as shown in FIG. 5 outside the pressure vessel behind the fast opening valve 66 of the active down system into the pipe duct 64 for the active rapid shut down system or directly (not represented) into the guide tube 1; through this the water from a pressurized supply flows, guided by valves for the upward movement of the control rod.

So as to move the piston upwards provision may be made for a duct 68 which leads to a low-pressure container, so that the reactor pressure presses the piston in a controlled manner downwards. On normal pressure release, the already mentioned pre-tensioned check valve 69 allows the required amount of medium (e.g. water) to flow. Should a pipe burst, the check valve 69 closes or prevents the piston from moving downwards.

In a pressure-less reactor the necessary provisions must be made for the supply of the piston for the run out.

FIG. 6 shows the passive shut-down system.

On the side of the lifting piston 3, 6 facing the reactor core the lifting cylinder 1 has an opening, so that the pressure in the reactor pressure vessel can act on the side of the lifting piston 3, 6 that is turned towards the reactor core. The space in the lifting cylinder on the side of the lifting piston 3, 6 facing the reactor core is sealed against the pressure medium in the reactor pressure vessel and has a duct 69' which is connected with a nonrepresented counter-pressure creating device outside the reactor pressure vessel. The pipe 69' has a branch 70 which leads to a condensation chamber 71 and which may be opened through a valve 72, the so-called "Scram valve." The condensation chamber 71 is at atmospheric pressure.

The described control rod drive in a rapid shut down operates as follows.

By means of the rapid shut down valve 72 mentioned the pressure from the part of the lifting cylinder 1 facing the reactor core over the lifting piston 3, 6 is reduced to that of the condensation chamber 71 under atmospheric pressure and the rod is injected. Should the pressure medium operating the control rods fail suddenly, which could happen for example as a result of a break in duct 69', the pressure on the side of the lifting piston 3, 6 facing the reactor core could decrease very quickly and the control rod would be driven by the pressure in the reactor vessel into the core with greater acceleration. Thus the system, on a breakdown, reacts on the safe side.

For driving the control rods out of the reactor core a pressure medium is also supplied in the lifting cylinder on the side of the lifting piston 3, 6 facing the reactor core along duct 69'. In this connection the duct 69 is for example connected with the primary water cleaning pump and/or the store pressure water pump of the reactor. As the reactor pressure operates on the side of the lifting piston 3, 6 that faces the reactor core, this supplied pressure must be greater than the pressure in the reactor pressure vessel.

Independently of the fast shut down eventuality, the fine adjustment of the control rods is effected by a modification of pressure in the lifting cylinder 2 above the lifting piston 3 via the duct 69'. By suitable measures affecting the lifting piston 3 and the lifting cylinder 2 care must be taken that this fine adjustment is possible according to accurately predetermined values. In the upward movement, the valve 73, which also leads to the chamber 71, is correspondingly adjusted by release of pressure. On the downward movement a corresponding pressure is applied on the piston over the upper portion of the duct 69'. This may take place, for example, also through a pressure increase in the wash water supply arrangement.

The advantages of this actuating system for a hydraulic or pneumatic control rod drive inside a pressure vessel consist in the first place in that, on a fracture of a drive medium duct or other defect leading to the failure of the drive medium, a fast shut down necessarily occurs. In addition, the costs of the fast shut down system are appreciably lower as compared with other known systems, and yet safety is increased.

Figure 7:
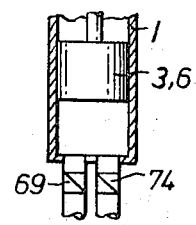

Should the reactor not yet be under pressure (starting stage), air, for example, may be produced at corresponding pressure in the reactor vessel. It is also possible to provide additionally to the connections in FIG. 6 an active system according to FIG. 5, whereby the duct 68 could be left out. Such a modification is shown in FIG. 7. Among other things, the active system could attend to the adjustment and to the rapid shut down in the starting stage. However, in this connection, it is necessary to secure the bottom opening on the guide tube, through which the reactor pressure operates, by a pretensioned check valve 74, so that the medium from the active system cannot flow directly into the reactor. The described flow off in the upper portion of the guide tube could however be left out, as the displaced medium can flow via the line 69'.

While the present invention has been described in conjunction with the embodiment of a drive shown in FIG. 1 of the previously filed application, it should be understood that the present invention can also be used in the embodiment shown in FIG. 2 of that application.

It should be noted, that, because the pressure in the guiding tube is about a small amount higher than the reactor pressure — caused by the introduction of the rinsing water — impurities (particles) from the reactor can be rejected or washed out.

It will be understood that the above description of the present invention is susceptible to various modifications, changes and adaptations, and the same are intended to be comprehended within the meaning and range of equivalents of the appended claims.

I claim:

1. In a control rod drive for the control rods of a nuclear reactor operated with a pressure medium and including, for each control rod, a guide tube provided with detents, an upper control piston operating the control rod and provided with latch devices, the upper control piston moving in the guide tube provided with detents and a lower control piston associated with the upper control piston, the lower control piston also being provided with latch devices, latch control devices associated with the control pistons to provide for the alternate releasing of their associated latch devices, the latch control devices permitting alternating movement of the two control pistons by one detent each in the same axial direction and that control piston which is at rest being latched in the detents by its associated latching device, the improvement which comprises:
   a. a primary hydraulic fluid source;
   b. means defining appreciable annular gaps between all parts that are moveable with respect to one another with said annular gaps providing bearing clearance between associated bearing surfaces, and the annular gaps associated with said upper control piston and said lower control piston being dimensioned with respect to one another in dependence on existing friction and pressure conditions;
   c. guide means mounting said control pistons at least approximately concentrically with respect to said guide tube along associated guide surfaces thereon and with less play with respect to the associated guide surfaces than the clearance between the bearing surfaces of said guide tube; and
   d. second means associated with said source for selectively maintaining a hydraulic fluid pressure condition within said guide tube which is in excess of fluid pressure in the reactor, which excess pressure is below that required to actuate the latch devices, said second means being disposed at an upper end of said guide tube and feeding fluid from said source into said guide tube for rinsing the interior of said guide tube.

2. An arrangement as defined in claim 1, wherein said second means is further selectively operable to feed hydraulic fluid from said source into said guide tube and at a pressure sufficient to cause downward movement of said control pistons in said guide tube.

3. An arrangement as defined in claim 1, further comprising a lifting piston rod connected between said upper control piston and the control rod, an upper cover on said guide tube, said lifting piston rod being disposed to penetrate through said upper cover, means defining an annular gap between said lifting piston rod and said upper cover, and second guide means mounting said lifting piston rod at least approximately concentrically with respect to the main axis of the drive and with a play, within the annular gap between said lifting piston rod and said upper cover, which is less than the radial dimension of this annular gap.

4. An arrangement as defined in claim 3, further comprising round stripper sheets which are disposed adjacent the annular gap between said lifting piston rod and said upper cover.

5. An arrangement as defined in claim 3, further comprising a lifting piston on said upper control piston, said lifting piston rod being connected to said lifting piston, a collecting sleeve disposed on said lifting piston, and a plurality of permanent magnets disposed in said collecting sleeve.

6. An arrangement as defined in claim 3, further comprising a conical collar on said lifting piston rod, a brake sleeve operatively mounted on said upper cover and disposed to overlie said conical collar and in a position for abutment by said conical collar after a predetermined upward movement of said conical collar.

7. An arrangement as defined in claim 6, further comprising a first check valve disposed adjacent the end of said guide tube which is opposite said upper cover, said first check valve being operatively associated with said brake sleeve during passive rapid shut-down of the reactor.

8. An arrangement as defined in claim 7, further comprising means defining two inlet openings at said end of said guide tube, a second check valve operatively associated with one of said inlet openings and said first check valve being associated with the other inlet opening, said check valves permitting fluid flow into said guide tube during a combined active and passive rapid shut-down of the reactor.

9. An arrangement as defined in claim 8, further comprising a pipe line connected to receive a pressure medium, a valve in said pipe line to control the flow of the pressure medium through said pipe line, a second pipe line connected to said second check valve, a fast-action opening valve in said second pipe line, a first branch pipe line connected between said pipe line and said second pipe line at a point in said second pipe line between said fast-action opening valve and said second check valve, and a second branch pipe line connected at one end to said pipe line and having its other end opening directly into said guide tube, whereby an upward setting movement of the control rods can be effected by the pressure medium.

10. An arrangement as defined in claim 6 further comprising a plate spring column on said upper cover for supporting said brake sleeve, means defining a water chamber below said plate spring column, means defining a plurality of different size choke openings in said brake sleeve, and a fixed edge portion on said upper cover, said openings being located adjacent said fixed edge portion, whereby, upon upward movement of said brake sleeve against said plate spring column, said openings are covered in succession by said fixed edge portion.

11. An arrangement as defined in claim 1, wherein said guide means includes at least three rollers disposed to lie in a common plane within each of said control pistons.

12. An arrangement as defined in claim 11, wherein each of said control pistons has a plurality of rollers disposed in a plurality of common planes one above the other.

13. An arrangement as defined in claim 11, further comprising guide rails disposed within said guide tube to extend alongside said control pistons over the entire stroke of the drive, and said rollers are disposed to move on said guide rails.

14. An arrangement as defined in claim 1, wherein the latch devices comprise lever mechanisms operatively disposed between each of said control pistons and said guide tube, each of said lever mechanisms having levers pivotally mounted within said control pistons to be selectively moved by said latch control devices, and rollers on the end of said levers adjacent said guide tube, whereby on actuation of said lever mechanisms by said latch control devices said levers and associated rollers are inserted and retracted from said detents.

* * * * *

UNITED STATES PATENT OFFICE
CERTIFICATE OF CORRECTION

Patent No. 3,830,694          Dated August 20th, 1974

Inventor(s) Heinz Acher

It is certified that error appears in the above-identified patent and that said Letters Patent are hereby corrected as shown below:

In the heading of the patent, line 4, change "Licentio" to --Licentia--. Column 10, line 31, change "69" to --69'-- (second occurrence).

Signed and sealed this 7th day of January 1975.

(SEAL)
Attest:

McCOY M. GIBSON JR.
Attesting Officer

C. MARSHALL DANN
Commissioner of Patents